United States Patent
Kato et al.

(10) Patent No.: US 9,175,782 B2
(45) Date of Patent: Nov. 3, 2015

(54) ALLOY FOR A FUSIBLE PLUG AND A FUSIBLE PLUG

(75) Inventors: Rikiya Kato, Soka (JP); Tetsuro Kikuchi, Iwate (JP); Mutsumi Deguchi, Chiba (JP)

(73) Assignee: SENJU METAL INDUSTRY CO., LTD., Tokyo (JP)

( * ) Notice: Subject to any disclaimer, the term of this patent is extended or adjusted under 35 U.S.C. 154(b) by 391 days.

(21) Appl. No.: 11/667,959

(22) PCT Filed: Nov. 24, 2004

(86) PCT No.: PCT/JP2004/017376
§ 371 (c)(1),
(2), (4) Date: Oct. 31, 2007

(87) PCT Pub. No.: WO2006/057029
PCT Pub. Date: Jun. 1, 2006

(65) Prior Publication Data
US 2008/0131309 A1    Jun. 5, 2008

(51) Int. Cl.
*F16K 17/38*    (2006.01)

(52) U.S. Cl.
CPC .................................... *F16K 17/383* (2013.01)

(58) Field of Classification Search
USPC .......................................... 148/400; 420/555
IPC ..................... F16K 17/383; C22C 12/00,28/00
See application file for complete search history.

(56) References Cited

U.S. PATENT DOCUMENTS

| 5,076,313 A | * | 12/1991 | Bottum et al. .................. 137/74 |
| 2006/0067852 A1 | | 3/2006 | Suh et al. ...................... 420/555 |

FOREIGN PATENT DOCUMENTS

| EP | 1645646 | | 4/2006 |
| EP | 1916313 | | 4/2008 |
| JP | 2001214985 | | 8/2001 |
| JP | 2001239392 | | 9/2001 |
| JP | 2001293594 | | 10/2001 |
| JP | 2001-325867 | * | 11/2001 |
| JP | 2001325867 | | 11/2001 |
| JP | 2002081599 A | * | 3/2002 |
| JP | 2002-115940 | * | 4/2002 |
| JP | 2002115940 | | 4/2002 |
| JP | 2002310543 | | 10/2002 |
| JP | 2003-013165 | * | 1/2003 |
| JP | 2003013165 | | 1/2003 |
| JP | 2003034831 A | * | 2/2003 |
| JP | 2003-130240 A | * | 3/2003 |
| JP | 2003-130240 | * | 5/2003 |
| JP | 2003130240 | | 5/2003 |
| JP | 2004176106 | | 6/2004 |

* cited by examiner

*Primary Examiner* — Sikyin Ip
(74) *Attorney, Agent, or Firm* — Michael Tobias

(57) ABSTRACT

Problem
A conventional alloy for a fusible plug contained harmful elements such as Cd or Pb, so there was a concern of pollution by these harmful elements. The present invention provides a fusible plug which does not contain the harmful components Cd or Pb, with which the alloy is not forced out of the fusible plug even when used for long periods as a safety device for refrigeration equipment, and which has a high mechanical strength such as creep strength.
Means for Solving the Problem
A fusible plug is used which employs a fusible alloy consisting essentially of 0.1-2.0 mass percent of Sn, 31-37 mass percent of Bi, and a remainder of In, the alloy melting at approximately at 70-75° C. A fusible plug is used which employs an alloy consisting essentially of 0.05-0.4 mass percent of Zn, 47-55 mass percent of Bi, and a remainder of In, the alloy melting at approximately 90-95° C.

9 Claims, 1 Drawing Sheet

ALLOY FOR A FUSIBLE PLUG AND A FUSIBLE PLUG

TECHNICAL FIELD

This invention relates to an alloy for a fusible plug which functions as a protective device for refrigeration equipment and particularly an alloy for a fusible plug which operates at 70-75° C. or 95-100° C. and a fusible plug which uses this alloy.

BACKGROUND ART

With large-sized refrigeration equipment, if the pressure inside the refrigeration equipment abnormally increases or the temperature of refrigerant increases, the refrigeration equipment itself may be damaged, and high pressure gas may spew out to damage the surroundings. As a mechanism for preventing damage and breakage of refrigerators, large-sized refrigeration equipment is required to have a safety device for controlling the pressure of refrigerant gas in the refrigeration equipment (Rule 7-1-8 of Refrigeration Safety Regulations of the Ministry of Economy, Trade, and Industry of Japan). Such equipment is typically provided with a safety device such as a fusible plug. Safety devices for refrigeration equipment are designed by each manufacturer in accordance with the refrigerant being used. In the past, freon and CFC (chlorofluorocarbon) refrigerants were the most widely used refrigerants in refrigeration equipment. However, CFC refrigerants can undergo photolysis in the stratosphere due to ultraviolet light in sunlight to form active chlorine, causing the problem that the ozone layer is destroyed by the active chlorine. Therefore, strict restrictions on the use of these refrigerants have been developed on a global level. Accordingly, they are now being replaced by HCFC (hydrochlorofluorocarbon) refrigerants which are replacements for freon. HFC (hydrofluorocarbon) refrigerants which have a small ozone depletion potential have also been developed. Thus, different types of refrigerants are being developed and used in refrigeration equipment.

Fusible plugs used in refrigeration equipment need to be designed based on the refrigerant which is used. When the pressure of refrigerant used in refrigeration equipment increases, the temperature of the refrigerant increases in accordance with Boyle's law. Therefore, the operating temperature of a fusible plug being used is determined in accordance with the condensing pressure of the refrigerant being used. For example, in the case of refrigerating equipment for air conditioning which employs R22 (HCFC 22) (which is the HCFC refrigerant which currently is most in demand) as a refrigerant for refrigeration equipment, the condensing pressure is 1.94 MPa and the critical temperature of R22 is 96.2° C. Thus, the operating temperature of a fusible plug is designed to be approximately 95-100° C.

The critical temperature varies with the refrigerant being used. When the refrigerant is changed, it is necessary to redesign the operating temperature of a fusible plug to be used in refrigeration equipment. When using R407C, which is a HFC refrigerant used as a replacement refrigerant having a small ozone depletion potential, the condensing pressure is 2.11 MPa and the critical temperature is 85.6° C., so a fusible plug having a design temperature of approximately 90-95° C. can be used. In the case of a fusible plug for use with R410a (which is a HCFC refrigerant having a good compression efficiency) as a refrigerant for refrigerating equipment, the condensing pressure is 3.06 MPa and critical temperature is 71.5° C. Since the critical temperature of the refrigerant rises, it is necessary to design refrigeration equipment so that the design temperature of the fusible plug is approximately 70-75° C.

Fusible plugs for refrigeration equipment use low melting point solder alloys, and solder alloys containing the harmful substances Pb and Cd have been employed. When R22 is used as a refrigerant, since the design temperature of a fusible plug is 96° C., Sn-52Bi-32Pb (eutectic point of 96° C.) has been used. When R410a is used as a refrigerant, the design temperature of a fusible plug becomes 70-75° C., and a solder alloy such as Sn-50Bi-10Cd-26.7Pb (solidus temperature of 69° C., peak temperature of 76° C., and liquidus temperature of 81° C.) has been used.

Fusible plugs are recovered together with refrigeration equipment. When refrigeration equipment is discarded, it is of course necessary to treat the equipment in accordance with laws and regulations. Particularly in recent years, active efforts are being made to protect the global environment, and there is a tendency to exclude harmful components from parts used in equipment such as refrigeration equipment. In particular, Cd and Pb components have a harmful effect on the human body, and they are becoming the subject of regulations.

Fusible plugs which do not contain harmful components such as Cd and Pb include ones using an alloy of two or more substances selected from Sn, Bi, In, Zn, and Ga (JP 2002-115940 A1), low melting point alloys for fusible plugs characterized by being a tin-indium-bismuth based alloy in which when the composition is Sn: X weight %, In: Y weight %, and Bi: Z weight %, then $X+Y+Z=100$ and $4 \leq X \leq 10$, and $56 \leq Y \leq 63$ (JP 2001-214985 A1), ones in which fine metal particles are added to a fusible alloy comprising bismuth, indium, and tin (JP 2003-130240), and the like.

Patent Document 1: JP 2002-115940 A1
Patent Document 2: JP 2001-214985 A1
Patent Document 3: JP 2003-130240 A1

DISCLOSURE OF INVENTION

Problem which the Invention is to Solve

In the past, fusible plugs used as safety devices in refrigeration equipment have used solder alloys containing the harmful substances Pb and Cd. However, in recent years, there has been active movement towards protecting the global environment, and there is a trend of excluding harmful components from parts used in equipment such as refrigeration equipment. In particular, Cd and Pb components have a harmful effect on the human body, and they are becoming the subject of regulation. Above-described Patent Document 1 discloses a tin (Sn)-indium (In)-bismuth (Bi) base alloy as an alloy for fusible plugs not containing harmful components such as Cd and Pb, but this alloy for a fusible plug has poor creep properties in a low temperature range, and during use as a safety device in refrigeration equipment, the alloy is sometimes forced out of a plug by pressure over time, and after a certain period has elapsed, it is necessary to stop the refrigeration equipment and replace the fusible plug.

Although it is not an alloy for a fusible plug for refrigeration equipment, an alloy for a thermal fuse containing at least 34 weight % and at most 63 weight % of bismuth, at least 1 weight % and at most 24 weight % of tin, and a remainder of indium has been disclosed (JP 2003-13165 A1). Since a low temperature thermal fuse is used as a load against abnormal high temperatures in electronic equipment, it is sufficient for it to cut off electricity in accordance with the temperature, pressure is not applied to it during use, and mechanical strength such as the creep strength of the alloy is not taken into consideration. Therefore, it cannot be used as is as an alloy for a fusible plug.

The present invention provides a fusible plug having a strong mechanical strength such as creep strength which does not contain the harmful components Cd or Pb, and in which an alloy is not pressed out of the plug even when the plug is used for long periods as a safety device for refrigeration equipment.

Means for Solving the Problem

As a result of diligent investigations concerning the defects of conventional alloys having a solidus temperature and a peak temperature of 65-75° C. or 85-95° C., the present inventors discovered that among Bi—In—Sn based alloys, alloys in a limited range of compositions have a solidus temperature and a peak temperature in the very narrow temperature range of approximately 70-75° C. and approximately 90-95° C. They found that these alloys are suitable as alloys for fusible plugs, and they thereby completed the present invention. Moreover, these alloys do not contain any of the harmful components Cd and Pb.

An alloy of the present invention which melts at approximately 70-75° C. is an alloy for a fusible plug, characterized by comprising 0.1-2.0 mass percent of Sn, 31-37 mass percent of Bi, and a remainder of In.

According to another aspect, an alloy of the present invention which melts at approximately 90-95° C. is an alloy for a fusible plug characterized by comprising 0.05-0.4 mass percent of Zn, 43-55 mass percent of Bi, and a remainder of In.

Effects of the Invention

An alloy for a fusible plug according to the present invention contains none of the harmful components Cd and Pb, and the alloy is not forced out from a plug during use. Therefore, a fusible plug in which an alloy of the present invention is used can be used for long periods without replacement as a safety device for refrigeration equipment.

BEST MODE FOR CARRYING OUT THE INVENTION

A fusible plug works at the melting temperature of an alloy for the fusible plug. Pressure is always applied to the plug by the refrigeration equipment, so if the mechanical strength such as the creep strength of the plug is low, the plug cannot function as a safety device. With a Bi—In—Sn based alloy which is an alloy having a solidus and peak temperature of approximately 70-75° C., if the Sn content is less than 0.1 mass percent, the mechanical strength of the alloy itself is low, and the amount by which the alloy protrudes in a pressure test, i.e., creep test exceeds a prescribed amount. On the other hand, if the Sn content is larger than 2.0 mass percent, the solidus temperature of the Bi—In—Sn based alloy decreases, so the melting temperature of the alloy approaches the temperature region of use, resulting in deterioration of the strength of the alloy, and creep properties deteriorate in the operating temperature range. Therefore, in a Bi—In—Sn based alloy according to the present invention, the Sn content is defined as 0.1-2.0 mass percent. If the Bi content is less than 31 mass percent, the liquidus temperature of a Bi—In—Sn based alloy increases too much, the melting properties of the alloy become poor, and it can no longer pass a melting test. On the other hand, if the Bi content becomes larger than 37 mass percent, the alloy composition deviates from the eutectic point of a Sn—In alloy, and the liquidus temperature rises too much. As a result, the melting properties of the alloy worsen, and a melting test can no longer be passed. Therefore, a Bi—In—Sn based alloy according to the present invention is defined as having a Bi content of 31-37 mass percent. In accordance with the present invention in which a composition comprising 0.1-2.0 mass percent of Sn, 31-37 mass percent of Bi, and a remainder of In is employed, it is possible to obtain an alloy for a fusible plug having good creep properties in a temperature range of use of 70-75° C. More preferably, when an alloy composition consisting of 0.5 mass percent of Sn, 35 mass percent of Bi, and a remainder of In is employed, it is possible to obtain an alloy for a fusible plug having the highest level of creep properties in the temperature range of use. When the contents of Sn and Bi, which are the basic components of an alloy for a fusible plug according to the present invention, deviate from the above-described composition, the melting temperature range broadens and operating stability is worsened.

When the Zn content is less than 0.05 mass percent in a Bi—In—Zn based alloy which is an alloy according to the present invention having a solidus and peak temperature of approximately 90-95° C., the mechanical strength of the alloy itself is low, and the amount by which the alloy protrudes in a pressure test exceeds a prescribed amount. If the Zn content is made larger than 0.4 mass percent, the solidus temperature of the Bi—In—Zn based alloy decreases. As a result, the melting temperature of the alloy approaches the temperature range of use, and the creep properties in the operating temperature range deteriorate. Therefore, in a Bi—In—Zn based alloy according to the present invention, the Zn content is defined as 0.05-0.4 mass percent. If the Bi content of a Bi—In—Zn based alloy according to the present invention is less than 43 mass percent, the liquidus temperature of the Bi—In—Zn based alloy increases too much, the melting properties of the alloy become poor, and the alloy can no longer pass a melting test. If the Bi content becomes larger than 37 mass percent, the liquidus temperature deviates from the eutectic point of a Sn—In alloy, and the liquidus temperature rises too much. As a result, the melting properties of the alloy become poor, and the alloy can no longer pass a melting test. Therefore, in a Bi—In—Zn alloy according to the present invention, the Bi content is defined as 43-55 mass percent. In accordance with the present invention in which an alloy with a Zn content of 0.05-0.4 mass percent, a Bi content of 43-55 mass percent, and a remainder of In is employed, it is possible to obtain an alloy for a fusible plug having good creep properties. More preferably, when the alloy composition consists of 0.2 mass percent of Zn, 48 mass percent of Bi, and a remainder of In, it is possible to obtain an alloy for a fusible plug having the best creep properties in the temperature range of use. When Zn and Bi, which are the basic constituent components of an alloy for a fusible plug according to the present invention, deviate from the above-described composition, the melting temperature range ends up broadening and the stability of operation of a fusible plug is impaired.

It is possible to add a strengthening element such as Cu, Sb, Ge, Ag, Au, Zn, Ni, or a member of the lanthanoid group to a Bi—In—Sn based alloy or a Bi—In—Zn based alloy according to the present invention. Members of the lanthanoid group are referred to as lanthanoids, and they are La as well as Ce, Pr, Nd, Pm, Eu, Th, Dy, Ho, Er, Tm, Yb, and Lu which have properties resembling those of La. These strengthening elements have an effect when added alone or when added in combination. Among strengthening elements, the addition of Cu most improves creep properties in a Bi—In—Sn based alloy or a Bi—In—Zn based alloy according to the present invention. However, in contrast to the invention of above-described Patent Document 3, the strengthening elements are always dissolved in a Bi—In—Sn based alloy or a Bi—In—Zn based alloy. If the added amount is too large, the melting temperature of the alloy ends up increasing. Therefore, the total amount of strengthening elements is preferably restricted to at most 2.0 mass percent. Most preferably, the added amount of each strengthening element is 0.1-1.0 mass percent for Cu, 0.2-2.0 mass percent for Sb, 0.1-1.0 mass percent for Ge, 0.1-0.7 mass percent for Ag, 0.1-0.6 mass percent for Au, 0.2-0.6 mass percent for Zn, 0.02-0.1 mass percent for Ni, and 0.01-0.1 mass percent for lanthanoids. If the amounts are smaller than these, an effective increase in the strength of the alloy is not obtained. If a larger amount is added, the liquidus temperature ends up increasing and operation can no longer take place in the desired temperature range.

A fusible plug according to the present invention is formed by melting a Bi—In—Sn based alloy or a Bi—In—Zn based alloy and sealing a blank with the alloy. Depending upon its shape, the blank can be formed into a single thread type, a double thread type, a flared pipe type, a porous type, or other type of fusible plug.

Example 1

An alloy for a fusible plug and a fusible plug according to the present invention were manufactured and their properties were compared.

The alloys for a fusible plug shown in Table 1 and Table 2 were prepared. The heating curve of each alloy composition was measured by differential thermal analysis. The solidus temperature, the peak temperature, and the liquidus temperature were measured based on the starting point of the heat absorption peak, the lowest point of the heat absorption peak, and the final point of the heat absorption peak. The melting temperatures of each alloy are shown in Table 1 and Table 2.

Comparative Examples 4 and 5 in Table 1 are alloys for fusible plugs of Patent Documents 2 and 3.

The measurement conditions for the melting temperatures were as follows.

1. Measurement by Differential Thermal Analysis

Differential thermal analyzer: differential thermal calorimeter made by SII.

Rate of temperature increase: 5 degrees per minute

Weight of sample: 10 mg

TABLE 1

| | | Alloy composition (mass %) | | | | | | | | | | Melting temperature (° C.) | | | Pressure test | FIG. 2 | Operating test (° C.) |
|---|---|---|---|---|---|---|---|---|---|---|---|---|---|---|---|---|---|
| | | In | Bi | Sn | Cu | Sb | Ge | Ag | Au | Zn | Ni | La | Solidus | Peak | Liquidus | | | |
| This invention | 1 | rem. | 31 | 0.1 | | | | | | | | | 72 | 73 | 77 | 1.2 | | 73 |
| | 2 | rem. | 31 | 0.3 | | | | | | | | | 72 | 73 | 75 | 1.1 | | 73 |
| | 3 | rem. | 35 | 1 | | | | | | | | | 71 | 72 | 73 | 0.9 | | 72 |
| | 4 | rem. | 37 | 0.5 | | | | | | | | | 70 | 71 | 77 | 0.8 | | 72 |
| | 5 | rem. | 35 | 0.1 | 0.1 | | | | | | | | 72 | 73 | 75 | 0.5 | | 73 |
| | 6 | rem. | 35 | 0.5 | 0.5 | | | | | 0.1 | | | 71 | 72 | 77 | 0.5 | | 73 |
| | 7 | rem. | 37 | 2 | 1 | | | | | 0 | | | 70 | 71 | 76 | 0.5 | | 72 |
| | 8 | rem. | 35 | 0.5 | | 1 | | | | | | | 72 | 73 | 76 | 0.5 | 1 | 73 |
| | 9 | rem. | 35 | 0.5 | | | 0.3 | | | | | | 71 | 72 | 74 | 0.6 | | 72 |
| | 10 | rem. | 35 | 0.5 | | | | 0.5 | | | | | 71 | 72 | 77 | 0.4 | | 74 |
| | 11 | rem. | 35 | 0.5 | | | | | 0.3 | | | | 72 | 73 | 75 | 1 | | 72 |
| | 12 | rem. | 35 | 0.5 | | | | | | | 0.2 | | 72 | 73 | 76 | 0.7 | | 73 |
| | 13 | rem. | 35 | 0.5 | 0.5 | 1 | | 0.3 | | | | 0.1 | 72 | 73 | 76 | 0.4 | | 73 |
| Comp. Ex. | 1 | rem. | 35 | | | | | | | | | | 72 | 73 | 73 | 2.3 | | 73 |
| | 2 | rem. | 38 | 0.3 | | | | | | | | | 71 | 73 | 80 | 1.2 | | 78 |
| | 3 | rem. | 35 | 0.5 | 1 | 1 | 1 | | | | | | 71 | 73 | 106 | 0.6 | | 82 |
| | 4 | rem. | 36 | 5 | | | | | | | | | 68 | 69 | 70 | 2.3 | 2 | 69 |
| | 5 | rem. | 30 | 10 | | | | | | | | | 64 | 67 | | half-molten 6.8 | 3 | 65 |

TABLE 2

| | | Alloy composition (mass %) | | | | | | | | | | Melting temperature (° C.) | | | Pressure test (mm) | Operating test (° C.) |
|---|---|---|---|---|---|---|---|---|---|---|---|---|---|---|---|---|
| | | In | Bi | Zn | Cu | Sb | Ge | Ag | Au | Ni | La | Solidus | Peak | Liquidus | | |
| This Invention | 1 | rem. | 47 | 0.05 | | | | | | | | 89 | 92 | | 1 | 92 |
| | 2 | rem. | 47 | 0.05 | | | | | 0.1 | | | 89 | 92 | 99 | 0.7 | 92 |
| | 3 | rem. | 47 | 0.4 | | | | | | | | 89 | 92 | 95 | 0.7 | 93 |
| | 4 | rem. | 48 | 0.2 | | | | | | | | 89 | 92 | | 0.8 | 92 |
| | 5 | rem. | 55 | 0.4 | | | | | | | | 89 | 92 | 99 | 0.6 | 93 |
| | 6 | rem. | 47 | 0.05 | 0.1 | | | | | 0.05 | | 89 | 92 | 94 | 0.6 | 92 |
| | 7 | rem. | 48 | 0.2 | 0.5 | | | | | | | 89 | 92 | 94 | 0.7 | 92 |
| | 8 | rem. | 55 | 0.4 | 1 | | | | | | | 89 | 92 | 99 | 0.6 | 95 |
| | 9 | rem. | 48 | 0.2 | | 1 | | | | | | 89 | 92 | 96 | 0.5 | 93 |
| | 10 | rem. | 48 | 0.2 | | | 0.3 | | | | | 89 | 92 | 94 | 0.7 | 92 |
| | 11 | rem. | 48 | 0.2 | | | | 0.5 | | | | 89 | 92 | 99 | 0.6 | 94 |
| | 12 | rem. | 48 | 0.2 | | | | | 0.3 | | | 89 | 92 | | 0.9 | 92 |
| | 13 | rem. | 48 | 0.2 | 0.5 | 1 | | 0.5 | | | 0.05 | 89 | 92 | 99 | 0.4 | 94 |

TABLE 2-continued

| | | Alloy composition (mass %) | | | | | | | | | Melting temperature (° C.) | | | Pressure test (mm) | Operating test (° C.) |
|---|---|---|---|---|---|---|---|---|---|---|---|---|---|---|---|
| | | In | Bi | Zn | Cu | Sb | Ge | Ag | Au | Ni | La | Solidus | Peak | Liquidus | | |
| Comp. Ex. | 1 | rem | 48 | | | | | | | | | 89 | 91 | | 2.3 | 92 |
| | 2 | rem | 48 | 1 | | | | | | | | 89 | 92 | 116 | 0.5 | 100 |
| | 3 | rem | 60 | 0.3 | | | | | | | | 89 | 92 | 105 | 0.6 | 98 |
| | 4 | rem | 48 | 0.5 | 1 | 1 | | 1 | | | | 89 | 92 | 118 | 0.5 | 102 |

Example 2

Blanks 1 for fusible plugs of the single thread type shown in FIG. 1 were filled with the fusible alloys of Table 1 and Table 2 to prepare fusible plugs. The creep properties of each alloy composition (referred to as a pressure test or creep test) and the operating temperature of the fusible plug were measured. A fusible plug having an overall length of 28 mm and an inner diameter of 3 mm at its tip portion was used for the pressure test and an operating test.

2. Pressure Test

1) A fusible plug was placed inside a constant temperature chamber set to 65° C. for a Bi—In—Sn based alloy and to 85° C. for a Bi—In—Zn based alloy, the plug was connected to a compressor, and a pressure of 15 MPa was applied.

2) After 24 hours, the fusible plug was removed from the constant temperature chamber and disconnected from the compressor.

3) After the plug sat for 24 hours, the length by which the fusible alloy used for filling the blank protruded from the blank was measured.

4) Tables 1 and 2 show the lengths by which alloys elongated during a pressure test, and FIG. 2 shows a typical photograph when the alloy compositions of an example and comparative examples in Table 1 were measured at 65° C. Photograph 1 shows the appearance of the fusible plug of Example 8, Photograph 2 shows the appearance of the fusible plug of Comparative Example 4, and Photograph 3 shows the appearance of the fusible plug of Comparative Example 5.

3. Operating Temperature

1) A fusible plug was connected to a compressor and a pressure of 3 MPa was applied.

2) The fusible plug connected to the compressor was placed into a water bath and heated by the water in the water bath.

3) The temperature at which air abruptly leaked from the fusible plug in the water bath was measured as the operating temperature.

In the photograph of FIG. 2, fusible plugs shown in Photographs 2 and 3 which were comparative examples of fusible plugs had a solidus temperature which was lower than that of the fusible plug of the example, so the alloy for a fusible plug protruded. In particular, the fusible plug shown in Photograph 3 which was a fusible plug of Comparative Example 5 became a half-molten body when heated at the test conditions of 65° C. In contrast, the fusible plug shown in Photograph 1, which is an example of the present invention, had only a small amount of protrusion of the alloy for the fusible plug, and there was no elongation of the alloy for the fusible plug.

A fusible plug according to the present invention operates at approximately 70-75° C. or approximately 90-95° C., and the low temperature creep properties of the alloy for a fusible plug are good. Accordingly, even when pressure is applied for a long period at a high temperature, the alloy for a fusible plug does not come out of a blank. Therefore, when it is used as a protective device for refrigeration equipment, it provides the effect which cannot be provided by conventional fusible plugs that it can be used for long periods.

EXPLANATION OF SYMBOLS

Figure 1:
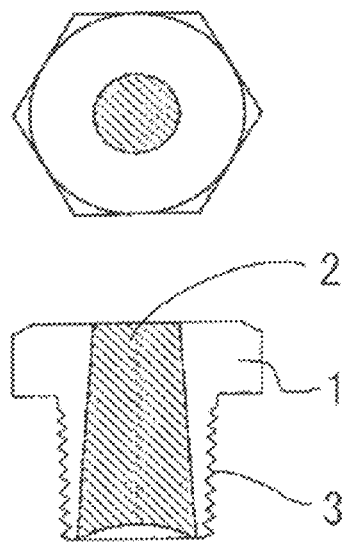
FIG. 1—This is a cross-sectional view of a fusible plug.
Figure 2:
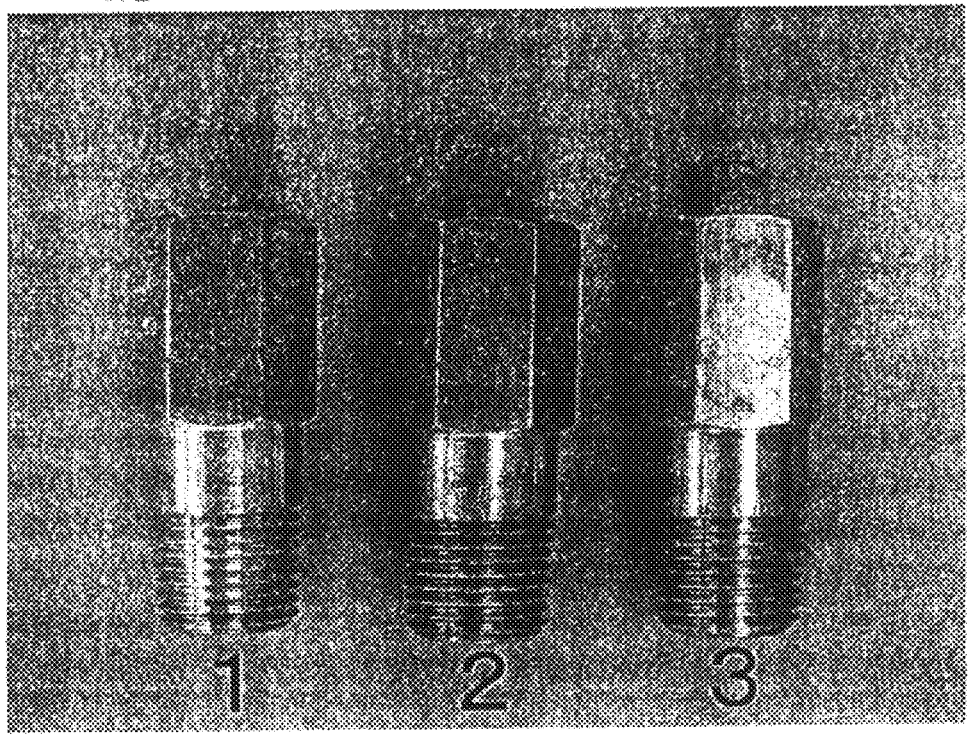
FIG. 2—This is a photograph of fusible plugs which underwent protrusion by pressure in a pressure test.

1 blank
2 fusible plug alloy
3 thread

INDUSTRIAL APPLICABILITY

An alloy for a fusible plug according to the present invention can be used not only for a fusible plug used as a protective device for refrigeration equipment but can also be used as an alloy for a sprinkler which, like a fusible plug, is always subjected to pressure.

The invention claimed is:

1. A fusible plug having an operating temperature of 70-75° C. and comprising a hollow blank having a bore and an alloy for a fusible plug sealing the bore and consisting of 0.5-2.0 mass percent of Sn, 31-37 mass percent of Bi, a total of at most 2.0 mass percent of at least one alloying element selected from 0.1-1.0 mass percent of Cu, 0.2-2.0 mass percent of Sb, 0.1-1.0 mass percent of Ge, 0.1-0.6 mass percent of Au, 0.02-0.1 mass percent of Ni, and 0.01-0.1 mass percent of a lanthanoid, and a remainder of In.

2. The fusible plug as claimed in claim 1 wherein the alloy contains 35-37 mass percent of Bi.

3. The fusible plug as claimed in claim 2 wherein the alloy contains 1.0 mass percent of Sn and 35 mass percent of Bi.

4. The fusible plug as claimed in claim 1 wherein the blank has a male thread formed on its exterior.

5. The fusible plug as claimed in claim 1 wherein the bore extends over the entire length of the blank.

6. The fusible plug as claimed in claim 1 wherein the bore is tapered over the length of the blank.

7. The fusible plug as claimed in claim 1 wherein the bore is sealed with the alloy by melting the alloy and filling the bore with the melted alloy.

8. A fusible plug for preventing damage to refrigeration equipment due to an abnormal pressure of refrigerant in the refrigeration equipment, the fusible plug having an operating temperature of 70-75° C. and comprising a hollow one-piece blank having a male thread formed on its exterior and a bore which extends over an entire length of the blank between opposite lengthwise ends of the blank, and a fusible alloy which is disposed inside the bore and seals the interior of the bore to prevent fluid from flowing through the bore between the opposite ends of the blank, the fusible alloy consisting of 0.5-2.0 mass percent of Sn, 31-37 mass percent of Bi, a total of at most 2.0 mass percent of at least one alloying element selected from 0.1-1.0 mass percent of Cu, 0.2-2.0 mass percent of Sb, 0.1-1.0 mass percent of Ge, 0.1-0.6 mass percent of Au, 0.02-0.1 mass percent of Ni, and 0.01-0.1 mass percent of a lanthanoid, and a remainder of In, the fusible alloy melting at the operating temperature to permit fluid to flow through the bore between the opposite ends of the blank.

9. The fusible plug as claimed in claim 8 wherein the bore is sealed with the fusible alloy by melting the fusible alloy and filling the bore with the melted fusible alloy.

\* \* \* \* \*